Jan. 24, 1967    E. L. SNYDER    3,299,541
SNOWSHOE AND TREAD THEREFOR
Filed Oct. 21, 1965    2 Sheets-Sheet 1
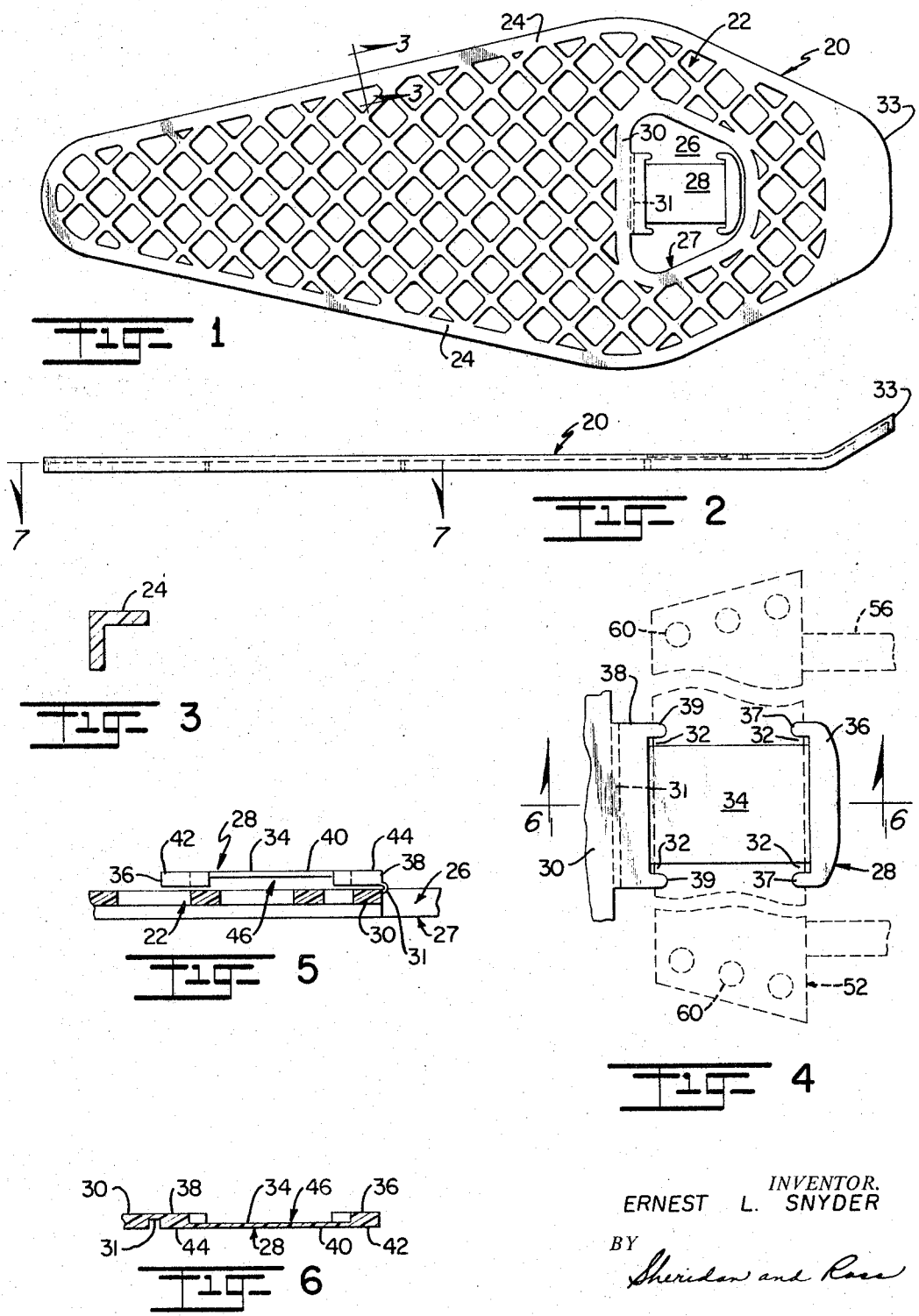
INVENTOR.
ERNEST L. SNYDER
BY
Sheridan and Ross
ATTORNEYS

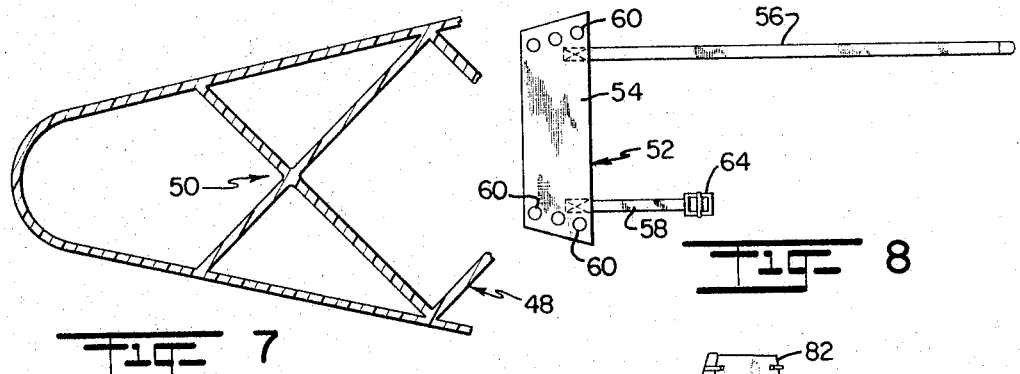

United States Patent Office 3,299,541
Patented Jan. 24, 1967

3,299,541
SNOWSHOE AND TREAD THEREFOR
Ernest L. Snyder, Boulder County, Colo., assignor to Design Enterprise, Inc., Boulder, Colo., a corporation of Colorado
Filed Oct. 21, 1965, Ser. No. 500,007
11 Claims. (Cl. 36—4.5)

The subject invention relates generally to snowshoes and more particularly to an improved snowshoe and tread therefor in which said tread is of considerably reduced weight and has an integrally formed hinge portion including harness engaging means formed thereon.

Prior art snowshoes have generally been disadvantageous from an overall weight and expense viewpoint or have been subject to excessive damage as a result of the method and means used to secure the harness to the snowshoe tread. For example, prior art snowshoes have weighed approximately two pounds each. A considerable portion of this weight was attributable directly to the means used to secure the harness to the snowshoe to prevent both longitudinal and lateral movement of the user's foot relative to the snowshoe. For example, most snowshoes incorporated thick cross-member portions in order to insure against a line of weakness at the point where the harness was secured to the tread. However, where lighter weight harness securement means were used, the snowshoe became easily damaged. It has been found, nevertheless that each of these disadvantages can be overcome through the use of a snowshoe tread formed from a plastic material, such as polypropylene, and having a toe aperture portion formed in the forward part thereof in which a hinge portion having harness securing or anchoring means is formed integrally connected to the rearward part of said aperture portion.

Accordingly, one of the principal objects of this invention is to provide a light weight, inexpensive-to-manufacture snowshoe tread.

Another object of this invention is to provide a snowshoe tread formed of plastic material and having harness engaging means formed upon an integrally connected hinge portion.

Another object of this invention is to provide a snowshoe tread having a toe aperture portion formed in the forward portion thereof and a hinge portion integrally connected to the rearward part of said aperture portion, said hinge portion being adapted for pivotal movement about the rearward part of said aperture portion to overlie a part of said snowshoe tread disposed rearwardly of said aperture portion, said hinge portion having longitudinally disposed, harness engaging slot means formed adjacent the opposite sides thereof.

Another object of this invention is to provide a light weight snowshoe tread upon which snow does not accumulate.

Another object of this invention is to provide a light weight snowshoe including means for securely attaching a shoe-like item of a user thereto to prevent lateral and longitudinal movement thereof relative to said snowshoe.

Another object of this invention is to provide a snowshoe having an improved light weight harness means of inexpensive construction.

Further objects and features of novelty of the invention will become apparent when referring, for a better understanding of the invention, to the following description taken in conjunction with the accompanying drawings wherein:

FIGURE 1 is a plan view of a preferred embodiment of a snowshoe tread constructed in accordance with the subject invention;

FIGURE 2 is a front elevational view of the snowshoe tread shown in FIGURE 1;

FIGURE 3 is a cross-sectional view taken along line 3—3 of FIGURE 1;

FIGURE 4 is an enlarged plan view of the hinge portion shown in FIGURE 1 showing in phantom a harness means attached or secured thereto;

FIGURE 5 is an elevational view in cross-section showing the integrally connected hinge portion of the snowshoe tread shown in FIGURE 1 overlying the portion of the snowshoe tread disposed immediately rearwardly said hinge portion;

FIGURE 6 is an elevational view in cross-section taken along lines 6—6 of FIGURE 4;

FIGURE 7 is a plan view taken along lines 7—7 of FIGURE 2;

FIGURE 8 is a plan view of a harness means;

FIGURE 9 is a perspective view of a lace means and the harness means shown in FIGURE 8 mounted upon the hinge portion of FIGURE 1;

FIGURE 10 is a side elevational view showing a snowshoe attached to a shoe-like item poised in mid stride;

FIGURE 11 is a plan view of another snowshoe tread configuration constructed in accordance with this invention; and FIGURE 12 is a front elevational view of the snowshoe tread shown in FIGURE 11.

Referring now to the figures, in FIGURES 1–6 is shown a snowshoe tread 20 constructed in accordance with the subject invention. Snowshoe tread 20 comprises a perforated web portion 22, a frame portion 24, preferably of an inverted L-shape when viewed in cross-section (see FIGURE 3), which surrounds said web portion 22, a toe aperture portion 26 formed in the forward part of said web portion 22, and surrounded by a reinforcing means 27, and a hinge portion 28 integrally connected to the rearward part 30 of said toe aperture portion 26 by a hinge means 31. The hinge portion 28 is adapted for pivotal movement about the rearward part 30 of said aperture portion to overlie a part of the snowshoe tread disposed rearwardly of said aperture portion as shown in FIGURE 5. The forward end 33 of snowshoe tread 20 is upturned or inclined from the horizontal, as shown in FIGURE 2, to insure against the snagging of the tread 20 on a rock or some other obstacle.

Referring now to FIGURES 4–6, the hinge portion 28 is shown as having longitudinally disposed, harness engaging slot means 32 formed adjacent the opposite sides thereof. Generally speaking, hinge portion 28 comprises a rectangular-shaped member 34 interconnecting opposed U-shaped members 36 and 38. Rectangular-shaped member 34 is formed of reduced thickness as compared with U-shaped members 36 and 38 and has one surface 40 thereof disposed generally coplanar with surface portions 42 and 44 of U-shaped members 36 and 38. Thus, with a construction as described, a recessed portion 46 results. The purpose of this recess portion 46 will be later described. The length of the U-shaped members 36 and 38 exceeds the width of the rectangular shaped member 34 by an amount such that the opposed surfaces of the arm portions 37 and 39 of said U-shaped members 36 and 38 and the adjacent side portion of member 34 will form the slots 32.

In FIGURE 7 a pair of reinforcing means 48 and 50 is shown formed in the rearward part of the snowshoe tread 20. The purpose of said reinforcing means 48 and 50 is to provide additional rigidity and strength to the snowshoe tread. It has further been found that such reinforcing means 48 and 50, in combination with the inverted L-shaped configuration of frame portion 24, see FIGURE 3, further insures against slippage of the snowshoe tread relative to a snow surface.

The preferred embodiment of a portion of a harness means 52 suitable for use in combination with a snowshoe tread 20 as constructed in accordance with this invention is shown in FIGURE 8. The harness means 52 comprises a laterally extending member 54 and a pair of elongated members 56 and 58 preferably of dissimilar lengths. The laterally extending member 54 is shown as having two rows of a plurality of eyelets or apertures 60. One of the rows is formed preferably convergent with respect to the other said row. As shown in FIGURES 9 and 10 a lace means 62 is appropriately threaded through said eyelets 60, much in the same manner as a shoe or boot is normally laced, for the purpose of encompassing said member 54 in snug relation about a shoe-like item. Each of the elongated members 56 and 58 is disposed adjacent a corresponding row of said eyelets 60 and extends outwardly thereof. One of said members 56 and 58 has a securement means formed thereon such as a buckle 64. The elongated members 56 and 58 are intended to be encompassed about the heel portion of a shoe-like item, as shown in FIGURE 10, to hold such shoe-like item in a predetermined position with respect to said harness means 52, and the hinge portion 28. The purpose of using rows of eyelets where one is formed convergent to the other is to provide a harness means which will readily conform to the outer surface of a shoe-like item.

Harness means 52 is adapted to be mounted upon the hinge portion 28 as shown in FIGURES 9 and 10 and as shown in phantom in FIGURE 4. Harness means 52 is disposed within and secured to the hinge portion 28 by means of slots 32.

In FIGURE 11 is shown another embodiment of a snowshoe tread 68 constructed in accordance with this invention. The configuration of snowshoe tread 68 is more appropriately referred to as the "bear paw" design. As such, it is characterized as having less length than the "trail" or "trapper" design as shown in FIGURE 1 and as having a more uniform and greater overall width. Additionally, the so called "bear paw" configuration does not have an upturned forward portion as in the case of forward portions 33 of the "trapper" model shown in FIGURES 1 and 2. Nevertheless, the snowshoe tread 68 shown in FIGURES 10 and 11 may be constructed utilizing the invention as described herein. Except for the overall design configuration, the snowshoe tread 68 is similar in construction to the snowshoe tread 20. More specifically, the snowshoe tread 68 has a web portion 70 preferably perforated, surrounded by a frame portion 72, preferably of inverted L-shape configurations when viewed in cross-section. The snowshoe tread 68 has a toe aperture portion 74 formed in the forward part thereof. The toe aperture portion 74 is preferably circumscribed by a reinforcing part 76. A hinge portion 78 is integrally connected to the rearward part 80 of the toe aperture portion 74 by hinge means 75 for pivotal movement thereabout. Suitable reinforcing means (not shown) is formed on the under surface of snowshoe tread 68 much in the same manner as reinforcing means 48 and 50 are formed on the under surface of snowshoe tread 20. Snowshoe tread 68 is adapted to be used in combination with a harness means similar to that shown in FIGURE 8 but in much the same manner as shown in FIGURES 9 and 10.

FIGURE 10 shows a shoe-like item 82 attached or secured to a snowshoe tread 20 by means of the harness 52 and lace means 62. FIGURE 10 shows the position of the snowshoe tread 20 and the shoe-like item 82 when the user thereof is in the process of taking a step or is in mid-stride. It is to be noted that in this position, the rearward part of the snowshoe tread 20 is normally in contact with and drags along the surface of the snow.

As previously indicated, the snowshoe treads described herein are formed from plastic. It has been found that with certain plastics such as polypropylene, the hinge portion may be integrally connected to the remaining portion of the tread through a hinge as shown herein and that the hinge increases in strength with each successive use rather than decreases in strength as is the case with many materials.

A particular advantage of the snowshoe constructed in accordance with this invention is that of securing a shoe-like item with a snowshoe tread by means of a harness which is anchored only by and to the hinge portion. In other words, a shoe-like item may be secured against longitudinal as well as lateral movement with respect to the snowshoe tread by the lace means 62 and harness means 52 in which the harness means 52 is positioned within the recess 46 and the longitudinally extending slots 32. It will be appreciated that the arm portions 37 of the U-shaped member 36 will not necessarily be required during the wearing of the snowshoe tread; however, it has been found that same are useful in securing the harness 52 to the snowshoe tread when the snowshoe tread is being carried on the user's back or otherwise. It has been found that less destructive stress is transmitted to the hinge means 31 due to the tendency of the hinge portion to resist deformation through a torsionally twisting thereof rather than absorb the entire force by the shear characteristics of the material.

It will be understood that the snowshoe tread constructed in accordance with this invention need not use a perforated webbing as shown; however, it will be appreciated that a perforated webbing is preferred both from a cost viewpoint and to insure that snow will not accumulate on the upper surface thereof. Although the length of the snowshoe tread may vary in certain limitations, it has been found that the preferred length thereof should approximate the user's stride which for most persons is approximately 30 inches. Additionally, it is preferred that the overall width of the snowshoe tread, which occurs in the vicinity of the rearward part of the toe aperture portion, is approximately 12 inches. Thus, when the forward and the rearward parts comprise triangular shaped portions, as shown, it has been found that the snowshoe tread will suitably intermesh upon use thereof without interfering with each other. Such is not ordinarily the case where the "bear paw" design is involved.

From the foregoing, it will be appreciated that a unique and novel snowshoe and tread therefore have been described. A snowshoe tread constructed in accordance with the invention will provide all the necessary strength required of a snowshoe but at a great savings in weight as well as cost. Additionally, the harness securing means formed on the integrally attached hinge portion provides in itself adequate anchoring for a shoe-like item.

It is to be understood that this invention is not limited to the exact embodiments of the devices shown and described, which are merely by way of illustration and not apparent to those skilled in the art, and it is therefore intended that the appended claims cover all such changes and modifications.

What I claim is:

1. A unitary, one-piece plastic snowshoe tread having a toe aperture portion formed in the forward part thereof and including a hinge portion integrally connected to the rearward part of said aperture portion, said hinge portion being adapted for pivotal movement about the rearward part of said aperture portion to overlie a part of said snowshoe tread disposed rearwardly of said aperture portion, said hinge portion including harness engaging means.

2. A unitary, one-piece plastic snowshoe tread having a toe aperture portion formed in the forward part thereof and including a hinge portion integrally connected to the rearward part of said aperture portion, said hinge portion being adapted for pivotal movement about the rearward part of said aperture portion to overlie a part of said snowshoe tread disposed rearwardly of said aperture portion, said hinge portion including means for securing thereto a portion of a harness means adapted to be used with said snowshoe tread to prevent longitudinal movement of the harness means relative to said hinge portion.

3. A unitary, one-piece plastic snowshoe tread having a toe aperture portion formed in the forward part thereof and including a hinge portion integrally connected to the rearward part of said aperture portion, said hinge portion being adapted for pivotal movement about the rearward part of said aperture portion to overlie a part of said snowshoe tread disposed rearwardly of said aperture portion, said hinge portion having longitudinally disposed U-shaped harness engaging slot means formed adjacent opposite sides thereof said slot means being disposed generally coplanarly with said hinge portion.

4. A snowshoe tread as described in claim 3 in which said hinge portion, in said overlying position, has a transversely disposed recessed portion formed on the undersurface thereof.

5. A snowshoe as described in claim 4 including reinforcing means formed depending from the lower surface portion of said web portion.

6. A unitary, one-piece plastic snowshoe tread comprising a web portion; a frame portion surrounding said web portion; a toe aperture portion formed in the forward part of said web portion; and a hinge portion integrally connected to the rearward part of said aperture portion, said hinge portion being adapted for pivotal movement about the rearward part of said aperture portion to overlie a part of the snowshoe tread disposed rearwardly of said aperture portion, said hinge portion including harness engaging means.

7. A snowshoe tread as described in claim 6 in which said harness engaging means includes a pair of longitudinally extending, U-shaped slots formed adjacent the opposite sides of said hinge portion, said slots being disposed generally coplanarly with said hinge portion, the open ends of said U-shaped slots on each side of said hinge portion being disposed facing each other.

8. A snowshoe as described in claim 6 in which said web portion is perforated and said aperture portion is circumscribed by a reinforcing portion.

9. A snowshoe as described in claim 6 in which said frame portion is, in cross-section, an inverted L-shaped configuration and the rearward part of said web portion has reinforcement means formed depending therefrom.

10. A snowshoe comprising harness means, lace means and a unitary, one-piece plastic snowshoe tread, said snowshoe tread having a toe aperture formed in the forward part thereof and including a hinge portion integrally connected to the rearward part of said aperture portion, said hinge portion being adapted for pivotal movement about the rearward part of said aperture portion to overlie a part of said tread disposed rearwardly of said aperture portion, said hinge potion having longitudinally disposed, harness engaging, U-shaped slot means formed adjacent opposite sides thereof, said harness means being secured to said snowshoe tread by said slot means, said lace means being attached to said harness means.

11. A snowshoe as described in claim 10 in which said harness means includes a laterally extending member adapted to encompass the toe portion of a shoe-like item and a pair of longitudinally disposed, elongated members of dissimilar lengths adapted to encompass about the heel portion of a shoe-like item and extending from opposite sides of said laterally extending member, said members being formed from flexible material, one of said longitudinally extending members having means formed thereon for securing one of said members to the other.

References Cited by the Examiner

UNITED STATES PATENTS

| 2,618,869 | 11/1952 | Wincentsen | 36—101 |
| 2,619,742 | 12/1952 | Cummings | 36—101 |
| 2,699,613 | 1/1955 | Peterson | 36—101 |
| 2,738,596 | 3/1956 | Walsh | 36—101 |
| 2,987,834 | 6/1961 | Howe | 36—101 |

FOREIGN PATENTS 634,114 1/1962 Canada.

PATRICK D. LAWSON, *Primary Examiner.*